United States Patent
Rhoden et al.

(10) Patent No.: US 10,906,634 B2
(45) Date of Patent: Feb. 2, 2021

(54) ELECTRIC VEHICLE MANAGEMENT ARCHITECTURE

(71) Applicant: Hamilton Sundstrand Corporation, Charlotte, NC (US)

(72) Inventors: William E. Rhoden, Glastonbury, CT (US); Peter J. Padykula, Brimfield, MA (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 322 days.

(21) Appl. No.: 15/876,890

(22) Filed: Jan. 22, 2018

(65) Prior Publication Data
US 2019/0225323 A1 Jul. 25, 2019

(51) Int. Cl.
| | | |
|---|---|---|
| *B64C 13/34* | (2006.01) | |
| *B64C 13/50* | (2006.01) | |
| *H04L 12/40* | (2006.01) | |
| *F02C 9/28* | (2006.01) | |
| *G05B 9/03* | (2006.01) | |
| *F02D 41/26* | (2006.01) | |

(52) U.S. Cl.
CPC ............ *B64C 13/34* (2013.01); *B64C 13/503* (2013.01); *F02C 9/28* (2013.01); *G05B 9/03* (2013.01); *H04L 12/40189* (2013.01); *B64D 2221/00* (2013.01); *F02D 41/266* (2013.01); *F05D 2260/80* (2013.01); *H04L 12/40019* (2013.01); *H04L 2012/4028* (2013.01)

(58) Field of Classification Search
CPC ...................................................... B64C 13/34
See application file for complete search history.

(56) References Cited

U.S. PATENT DOCUMENTS

| | | | | |
|---|---|---|---|---|
| 7,406,370 B2 * | 7/2008 | Kojori | ...................... | G05B 9/03 180/65.8 |
| 7,950,606 B2 | 5/2011 | Atkey et al. | | |
| 8,036,805 B2 | 10/2011 | Mahoney et al. | | |
| 8,825,227 B2 | 9/2014 | Saint-Marc et al. | | |
| 8,977,798 B2 | 3/2015 | Mitani et al. | | |
| 9,081,372 B2 * | 7/2015 | Fervel | ................... | B64C 13/505 |
| 9,109,538 B2 | 8/2015 | Maalioune | | |
| 9,327,600 B1 * | 5/2016 | Nehmeh | ................... | B60L 1/00 |

(Continued)

FOREIGN PATENT DOCUMENTS

CN 103850802 A 6/2014

OTHER PUBLICATIONS

Moog Aircraft Group and Hispano-Suiza Safran Group, "Electric Actuation for Flight & Engine Control" SAE-ACGSC Mtg 99, Boulder, Mar. 2, 2007. (Year: 2007).*

(Continued)

*Primary Examiner* — Michael A Berns
(74) *Attorney, Agent, or Firm* — Cantor Colburn LLP

(57) ABSTRACT

An air vehicle control system is described that includes a computer-implemented controller. The controller is configured to control an air vehicle, where the air vehicle is logically divided into four sections of electrical and mechanical devices that are operatively connected to the controller via a control data bus and an actuation bus. The four sections include a forward sector, a left engine sector, a right engine sector, and an aft sector. The controller controls all four sections of electrical and mechanical devices of the air vehicle.

18 Claims, 2 Drawing Sheets

(56) References Cited

U.S. PATENT DOCUMENTS

| | | |
|---|---|---|
| 9,388,744 B2 | 7/2016 | Mathews, Jr. et al. |
| 9,533,636 B2 * | 1/2017 | Brouwer ............. B60R 16/0238 |
| 9,688,414 B2 | 6/2017 | Burns et al. |
| 2015/0102663 A1 | 4/2015 | Brouwer et al. |
| 2018/0022443 A1 * | 1/2018 | Nakagawa ................ H02P 6/00 244/227 |
| 2019/0225323 A1 * | 7/2019 | Rhoden ................... B64C 13/34 |

OTHER PUBLICATIONS

Extended European Search Report for EP Application No. 19153059.1 dated Jun. 18, 2019, pp. 1-8.

* cited by examiner

ELECTRIC VEHICLE MANAGEMENT ARCHITECTURE

BACKGROUND

Exemplary embodiments pertain to the art of electric vehicle management and more particularly to electric vehicle management architecture for electric aircraft.

An optimized electric vehicle management system is desired to efficiently manage multiple subsystems on an electric aircraft. No conventional systems exist that involve the entire air vehicle and allow optimization of all systems to the benefit of the air vehicle.

It is advantageous to optimize coordination between the numerous subsystems on the air vehicle in a modular architecture to improve the environment for sensitive electronics, increase flexibility, and reduces obsolescence of equipment.

BRIEF DESCRIPTION

Disclosed is an air vehicle control system that includes a computer-implemented controller. The controller is configured to control an air vehicle, where the air vehicle is logically divided into four sections of electrical and mechanical devices that are operatively connected to the controller via a control data bus and an actuation bus. The four sections include a forward sector, a left engine sector, a right engine sector, and an aft sector. The controller controls all four sections of electrical and mechanical devices of the air vehicle.

Also disclosed is an air vehicle configured with the air vehicle control system described above.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

Air vehicle management systems for aircraft can be accomplished using various mixes of components and architectures. Current air vehicle management systems do not have a nose-to-tail incorporation of all aircraft controls, which can create unnecessary weight, complexity in maintaining the aircraft, and increase the complexity of system software for controlling various components of the air vehicle. An optimized electric air vehicle management system is advantageous to efficiently manage multiple subsystems on air electric aircraft. It is also advantageous to optimize coronation between the numerous subsystems on the air vehicle 10 and in modular architecture to improve the environment for sensitive electronics, increase flexibility, and reduce obsolescence of equipment.

Figure 1:
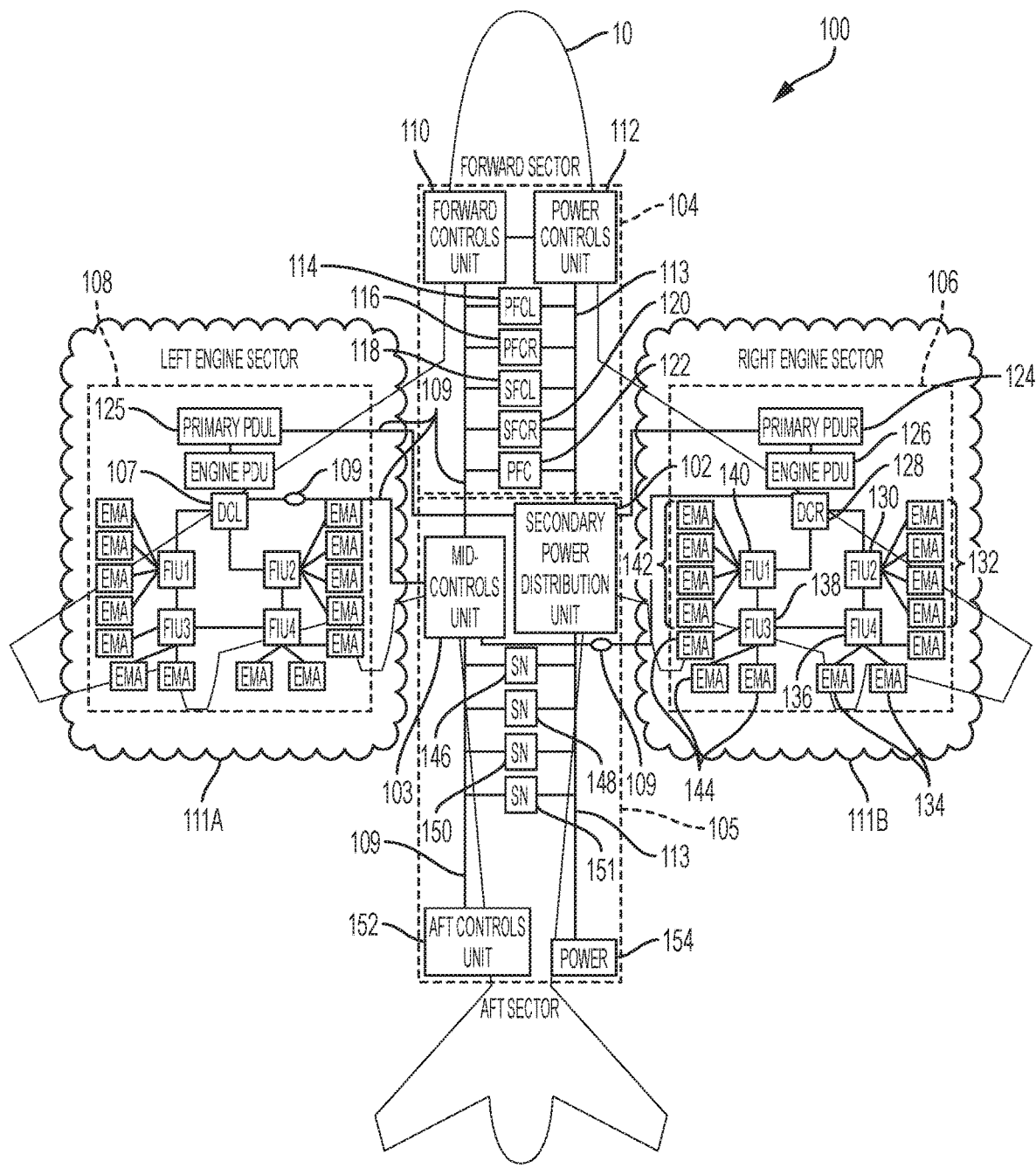
FIG. 1 is an air vehicle control system configured to control four logically divided parts of an air vehicle from a central controller.

According to one embodiment, FIG. 1 depicts an air vehicle control system 100 (hereafter referred to as "control system 100"). The control system 100 is configured to control an entire air vehicle from forward sector to the aft of the airframe. The system 100 is configured in four main sectors, with a forward sector 104, a left engine sector 108, a right engine sector 106, and aft sector 105.

By way of an architectural overview according to embodiments of the present invention, the 4-section architecture for controlling the air vehicle 10 is supported by power and data feeds throughout the air vehicle 10. A actuation bus 113 and a control data bus 109 are configured to run the length of the fuselage, connecting a forward sector 104 and an aft sector 105 of the air vehicle 10. Left and right engine sectors 108, 106, respectively, complete the air vehicle 10 architecture. Vehicle controls are located in the forward sector 104 with primary and secondary controllers throughout the airframe and engines (not shown). Power is distributed from the engines through a secondary power distribution unit 102 to all subsystems and components. Two Engine Local Area Networks, 111A for the left engine sector 108, and 111B for the right engine sector 106, manage power and data for each engine through data concentrators and full authority digital engine control (FADEC) interface units (e.g., the engine information units 130, 136, 138, and 140 as shown in the right engine sector 106). Fourteen individual controllers (depicted as pluralities of engine actuators 132, 134, 142, and 144) are positioned on each engine as required to provide actuator function.

The forward sector 104 includes a forward controls unit 110, power control unit 112, and a plurality of flight control units 114, 116, 118, 120, and 122. The flight control units include a primary flight control left (PFCL) unit 114, a primary flight control right (PFCR) unit 116, a secondary flight control (SFCL) unit 118, a secondary flight control right (SFCR) unit 120, and a primary flight control (PFC) unit 122. Those skilled in the art appreciate the known functionalities of each of the flight control units 114-122, and thus, detailed descriptions of each are omitted herein for brevity.

The forward controls unit 110 provide control for cockpit functions, galley functionalities, environmental control systems (ECS) (not shown), interior aircraft lights, thrust reversers (not shown) for the air vehicle 10, and connectivity controls for on-aircraft communication and intra-aircraft communication systems (not shown). The forward controls unit 110 can include one or more computer processors such as processor 201, as shown with respect to FIG. 2.

The forward sector 104 also includes the power control unit 112. The power control unit 112 controls power distribution and power control for all cockpit systems, flight systems, the galley systems, environmental control systems (ECS), interior lights, thrust reversers, and all connectivity controls such as those controlled by the forward controls unit 110. The power control unit 112 may include one processor or plurality of processors such as processor 201 show with respect to FIG. 2.

The mid-controls unit 103 is operatively control to the forward control unit 110 by the control data bus 109. The mid-controls unit 103 is configured as a control center for interfacing with the air vehicle 10 engines. The mid-controls unit 103 is configured to control a landing gear (not shown) of the air vehicle 10, one or more electric brakes on the landing gear, and interface with the flight controls. In one embodiment, the engine controls that, in conventional systems, are attached to and part of the aircraft engines, are not operational and a part of the mid-controls unit 103. Stated in another way, the engine controllers are off-engine and physically located in the mid-controls unit 103. Although shown as being located in the fuselage, it is appreciated that the mid-controls unit 103 may be located anywhere on the aircraft (but physically separate from the engine(s)). As used herein, the engine controllers are the controllers associated with operation of the engine(s) based on environmental factors and command requests, such as, for example, fuel flow, thrust requests, etc.

The mid-controls unit 103 is operatively connected with the engines via the control data bus 109. The control data bus 109 may take the form of various known engine buses such as, for example, PCIe, a TTE, or another bus structure known in the art configured to interface with a VersaModular Eurocard (VME) bus at a data concentrator box. Exemplary data concentrator boxes are shown as data concentrator left 107, as depicted in the left engine sector 108, and the data concentrator right 128, as shown in the right engine sector 106.

The left engine sector 108 and the right engine sector 106, although referred to as separate sub-systems herein, are considered to be substantially the same as one another with respect to architecture and components. Although the right engine sector 106 will be described in greater detail, it should be understood that the left engine sector 108 contains like components, organized in a similar architecture as described with respect to the right engine sector 106.

According to one embodiment, power is generated by generators on each engine and is supplemented as needed by the auxiliary power unit. Each Primary PDU controls the generators on that engine and distributes power to the Engine PDU and the Secondary Power Distribution Unit. Distribution is controlled by the power control unit 112 and a secondary power distribution unit 102. The secondary power distribution unit 102 is configured to distribute primary power to all components or systems via the power bus (113).

The primary power distribution units for the left and right (125, 124, respectively) are configured to manage primary power as generated by the engine generator(s) and distribute power to the Engine Power Distribution Unit 126 and the Secondary Power Distribution unit 102. For example, describing only right engine sector 106 (with the understanding that the description refers to like components in left engine sector 108) the primary power distributional unit 124 is operatively connected to the primary engine power distribution unit right 126. The primary power distribution unit right 124 is also operatively connected to the secondary power distribution unit 102. The Primary Power Distribution Unit Right 124 receives commands from the Power Control Unit 112 such as generator operating mode and power load sharing. The Primary PDU provides feedback to the Power Control Unit 104 for example on component health and power quality. The secondary power distribution unit 102 distributes power to all components on the power bus 113. The SPDU 102 is controlled by the Power Control unit 112 and can be configured to isolate sectors where an electrical fault is detected.

The right engine sector 106 includes the primary power distribution unit 124, and the engine power distribution unit 126, which is connected to the data concentrator right 128. The data concentrator right 128 is in communication with a plurality of an engine interface units configured to send and receive data to engine components, such as the engine interface units 140, the engine interface units 138, the engine interface unit 130, and the engine interface unit 136. An engine interface unit manages a plurality of EMA controllers and sensors on each engine. EMA controllers are grouped together by a function of or a location respective to a servicing engine information unit.

Although four engine interface units are shown, it is appreciated that the architecture of the system 100 can include any number of engine interface units. Each of the engine interface units 130, 136, 138, and 140, are configured to direct communication with a plurality of engine actuators 132, 134, 144, and 142, respectively. Each of the engine interface units 136, 138, 140, and 134 are also in communication with one another. The secondary power dissolution unit 102 is further connected with an auxiliary power unit 154, as shown in the aft sector 105 of the air vehicle control system 100.

The control system 100 can further include one or more smart control nodes, which may be configured as independent or semi-independent controllers (being controllable alone or in connection with the mid-controls unit 103) for controlling a dedicated functionality of the aircraft. For example, the control system 100 can include an engine control node 146, a landing gear control node 148, and an electric brake controller 150. Each of the smart control nodes 146, 148, 150 receives command instructions from the control data bus 109, and receives power from the power bus 113. The smart control nodes 146, 148, and 150 also issue actuator position information, status information, and other control response messages to the mid-controls unit 103, the forward controls unit 110, and the aft controls unit 152.

Power bus 113 may be configured as a power distribution bus that can be an all-electric actuation bus, a traditional bus such as a hydraulic actuation distribution bus, or a hybrid distribution bus such as electro-hydraulic actuation bus, an electro-hydrostatic (EHA) or similar distribution bus.

The ancillary power unit 154 is controlled by the Power Control Unit 112 and can be configured as one or more power generation units such as, for example, a jet engine, an energy harvesting power generator, or other power generation mechanism configured to generate auxiliary power for normal in-flight, emergency in-flight and ground operations. The ancillary power unit 154 is brought on-line as commanded by the Power Controls Unit 112 and power is distributed through the secondary power distribution unit 102 as the electrical needs of the aircraft require.

Figure 2:
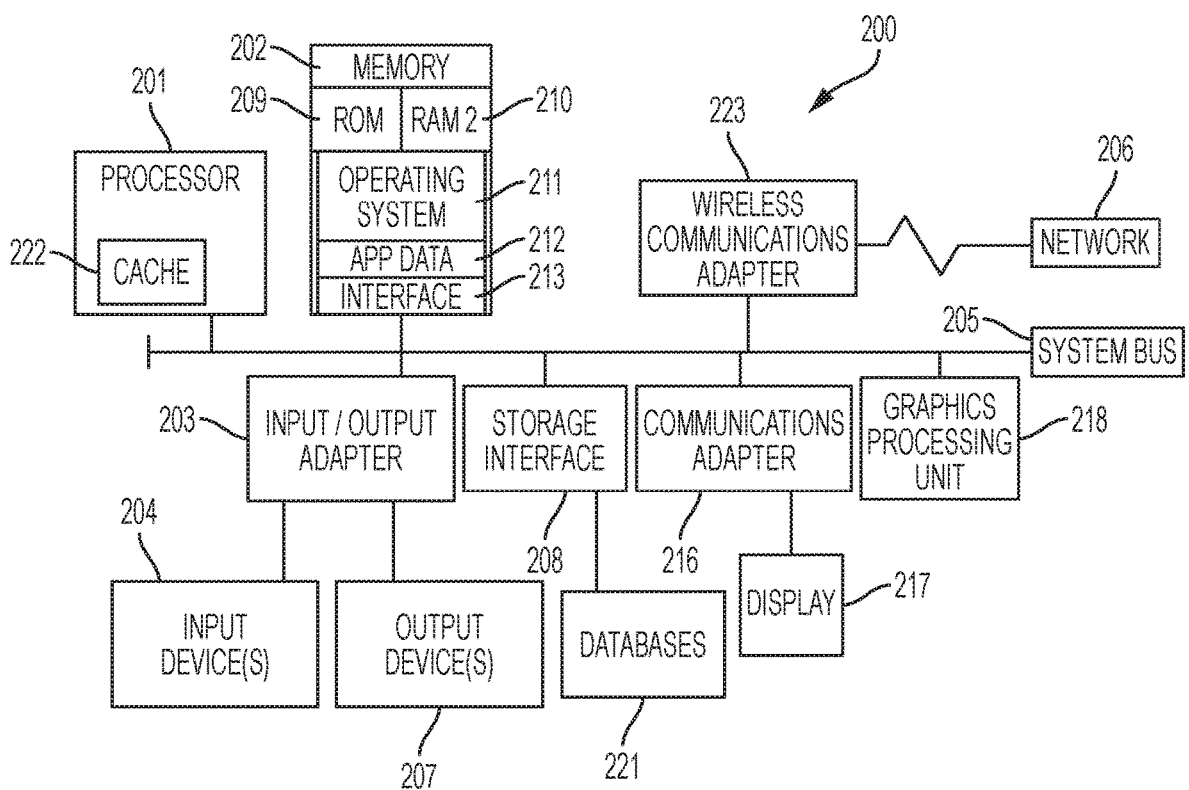
FIG. 2 is a computer system for practicing one or more embodiments of the present invention.

FIG. 2 illustrates a block diagram of an exemplary computing environment and computer system 200 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 200 therefore can embody a general-purpose computer. In another exemplary embodiment, the implementation can be part of a mobile device, such as, for example, a mobile phone, a personal data assistant (PDA), a tablet computer, etc.

As shown in FIG. 2, the computer 200 includes processor 201. Computer 200 also includes memory 202 communicatively coupled to processor 201, and one or more input/output adapters 203 that can be communicatively coupled via system bus 205. Memory 202 can be communicatively coupled to one or more internal or external memory devices via a storage interface 208. Communications adapter 216 can communicatively connect computer 200 to one or more networks 206. System bus 205 can communicatively connect one or more user interfaces via input/output (I/O) adapter 203. I/O adapter 203 can connect a plurality of input devices 204 to computer 200. Input devices can include, for example, a keyboard, a mouse, a microphone, a sensor, etc. System bus 205 can also communicatively connect one or more output devices 207 via I/O adapter 203. Output device 207 can include, for example, a display, a speaker, a touchscreen, etc.

Processor 201 is a hardware device for executing program instructions (aka software), stored in a computer-readable memory (e.g., memory 202). Processor 201 can be any custom made or commercially available processor, a central processing unit (CPU), a plurality of CPUs, an auxiliary processor among several other processors associated with the computer 200, a semiconductor based microprocessor (in the form of a microchip or chip set), or generally any device for executing instructions. Processor 201 can include a cache memory 222, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 222 can be organized as a hierarchy of more cache levels (L1, L2, etc.).

Processor 201 can be disposed in communication with one or more memory devices (e.g., RAM 209, ROM 210, one or more external databases 221, etc.) via a storage interface 208. Storage interface 208 can also connect to one or more memory devices including, without limitation, one or more databases 221, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 202 can include random access memory (RAM) 209 and read only memory (ROM) 210. RAM 209 can be any one or combination of volatile memory elements (e.g., DRAM, SRAM, SDRAM, etc.). ROM 210 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 202 can incorporate electronic, magnetic, optical, and/or other types of non-transitory computer-readable storage media. Memory 202 can also be a distributed architecture, where various components are situated remote from one another, but can be accessed by processor 201.

The instructions in memory 202 can include one or more separate programs, each of which can include an ordered listing of computer-executable instructions for implementing logical functions. In the example of FIG. 2, the instructions in memory 202 can include an operating system 211. Operating system 211 can control the execution of other computer programs and provides scheduling, input-output control, file and data management, memory management, and communication control and related services.

The program instructions stored in memory 202 can further include application data 212, and for a user interface 213.

I/O adapter 203 can be, for example but not limited to, one or more buses or other wired or wireless connections. I/O adapter 203 can have additional elements (which are omitted for simplicity) such as controllers, microprocessors, buffers (caches), drivers, repeaters, and receivers, which can work in concert to enable communications. Further, I/O adapter 203 can facilitate address, control, and/or data connections to enable appropriate communications among the aforementioned components.

I/O adapter 203 can further include a display adapter coupled to one or more displays. I/O adapter 203 can be configured to operatively connect one or more input/output (I/O) devices 207 to computer 200. For example, I/O 203 can connect a keyboard and mouse, a touchscreen, a speaker, a haptic output device, or other output device. Output devices 207 can include but are not limited to a printer, a scanner, and/or the like. Other output devices can also be included, although not shown. Finally, the I/O devices connectable to I/O adapter 203 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 200 can include a wireless communications adapter 223. Wireless communications adapter 223 can include GPS, cellular, mobile, and/or other communications protocols for wireless communication.

In some embodiments, computer 200 can further include communications adapter 216 for coupling a display 217 to the network 206.

The network 206 can be an IP-based network for communication between computer 200 and any external device. Network 206 transmits and receives data between computer 200 and devices and/or systems external to computer 200. In an exemplary embodiment, network 206 can be a managed IP network administered by a service provider. Network 206 can be a network internal to an aircraft, such as, for example, an avionics network, etc. Network 206 can be implemented in a wireless fashion, e.g., using wireless protocols and technologies, such as WiFi, WiMax, etc. Network 206 can also be a wired network, e.g., an Ethernet network, an ARINC 429 network, a controller area network (CAN), etc., having any wired connectivity including, e.g., an RS232 connection, R5422 connection, etc. Network 206 can also be a packet-switched network such as a local area network, wide area network, metropolitan area network, Internet network, or other similar type of network environment. The network 206 can be a fixed wireless network, a wireless local area network (LAN), a wireless wide area network (WAN) a personal area network (PAN), a virtual private network (VPN), intranet or other suitable network system.

The memory 202 can further include a basic input output system (BIOS) (omitted for simplicity). The BIOS is a set of routines that initialize and test hardware at startup, start operating system 211, and support the transfer of data among the operatively connected hardware devices. The BIOS is typically stored in ROM 210 so that the BIOS can be executed when computer 200 is activated. When computer 200 is in operation, processor 201 can be configured to execute instructions stored within the memory 202, to communicate data to and from the memory 202, and to generally control operations of the computer 200 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure optimize coordination between the numerous subsystems on the air vehicle 10 in a modular architecture. Aspects of the present invention improve the environment for sensitive electronics by decreasing needed support architecture for disparate avionics systems, increases flexibility of the avionics system by centralizing control and separating control mechanisms from the engines, and reduces obsolescence of legacy components by providing a simpler architecture compared to conventional airframe avionics systems.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air vehicle control system comprising:
a computer-implemented controller configured to control an air vehicle, the air vehicle logically divided into four sections of electrical and mechanical devices operatively connected to the controller via a control data bus and an actuation bus;
wherein the four sections comprise a forward sector, a left engine sector, a right engine sector, and an aft sector;
wherein the controller controls all four sections of electrical and mechanical devices of the air vehicle; and
wherein a mid-controls unit is operatively connected with one or more air vehicle engines via the control data bus and the actuation bus and controls all-electric actuation of the one or more air vehicle engines, the all-electric actuation requiring that every aspect of starting the one or more air vehicle engines uses electric power.

2. The control system of claim 1, wherein the forward sector comprises a forward controls unit, a power control unit, and a plurality of flight control units.

3. The control system of claim 2, wherein the flight control units comprise a primary flight control left unit, a primary flight control right unit, a secondary flight control unit, a secondary flight control right unit, and a primary flight control unit.

4. The control system of claim 2, wherein the forward controls unit is configured to control one or more of a group of functionalities and systems comprising a cockpit function, a galley function, an environmental control system, a lighting system comprising a plurality of interior aircraft lights, one or more thrust reversers, and one or more aircraft communications systems.

5. The control system of claim 2, wherein the power control unit is configured to control power distribution for one or more of a group of functionalities and systems comprising a cockpit function, a galley function, an environmental control system, a lighting system comprising a plurality of interior aircraft lights, one or more thrust reversers, and one or more aircraft communications systems.

6. The control system of claim 1 wherein the aft sector comprises the mid-controls unit operatively connected with the one or more air vehicle engines via the control data bus and the actuation bus.

7. The control system of claim 6, wherein the mid-controls unit is configured as a control center for interfacing with the one or more air vehicle engines, with a landing gear, and with one or more electric brakes.

8. The control system of claim 6, wherein the mid-controls unit is configured to be separate from the one or more air vehicle engines such that one of the one or more air vehicle engines may be removed from the aircraft without removing the mid-controls unit.

9. The control system of claim 6, wherein the left engine sector and the right engine sector each comprise:
a primary power distribution unit operatively connected with the mid-controls unit;
an engine power distribution unit in communication with the primary power distribution unit; and
a data concentrator operatively connected to the engine power distribution unit and configured to route commands to and receive data from a plurality of engine actuators on each of the one or more vehicle engines.

10. An air vehicle comprising:
an air vehicle control system configured to control an air vehicle, the air vehicle logically divided into four sections of electrical and mechanical devices operatively connected to a controller via a control data bus and an actuation bus;
wherein the four sections comprise a forward sector, a left engine sector, a right engine sector, and an aft sector;
wherein the controller controls all four sections of electrical and mechanical devices of the air vehicle; and
wherein a mid-controls unit is operatively connected with one or more air vehicle engines via the control data bus and the actuation bus and controls all-electric actuation of the one or more air vehicle engines, the all-electric actuation requiring that every aspect of starting the one or more air vehicle engines uses electric power.

11. The air vehicle of claim 10, wherein the forward sector comprises a forward controls unit, a power control unit, and a plurality of flight control units.

12. The air vehicle of claim 11, wherein the flight control units comprise a primary flight control left unit, a primary flight control right unit, a secondary flight control unit, a secondary flight control right unit, and a primary flight control unit.

13. The air vehicle of claim 11, wherein the forward controls unit is configured to control one or more of a group of functionalities and systems comprising a cockpit function, a galley function, an environmental control system, a lighting system comprising a plurality of interior aircraft lights, one or more thrust reversers, and one or more aircraft communications systems.

14. The air vehicle of claim 11, wherein the power control unit is configured to control power distribution for one or more of a group of functionalities and systems comprising a cockpit function, a galley function, an environmental control system, a lighting system comprising a plurality of interior aircraft lights, one or more thrust reversers, and one or more aircraft communications systems.

15. The air vehicle of claim 10 wherein the aft sector comprises the mid-controls unit operatively connected with the one or more air vehicle engines via the control data bus and the actuation bus.

16. The air vehicle of claim 15, wherein the mid-controls unit is configured as a control center for interfacing with the one or more air vehicle engines, with a landing gear, and with one or more electric brakes.

17. The air vehicle of claim 15, wherein the mid-controls unit is configured to be separate from the one or more air vehicle engines such that one of the one or more air vehicle engines may be removed from the aircraft without removing the mid-controls unit.

18. The air vehicle of claim 15, wherein the left engine sector and the right engine sector each comprise:
   a primary power distribution unit operatively connected with the mid-controls unit;
   an engine power distribution unit in communication with the primary power distribution unit; and
   a data concentrator operatively connected to the engine power distribution unit and configured to route commands to and receive data from a plurality of engine actuators on each of the one or more vehicle engines.

* * * * *